United States Patent [15] 3,651,472

Holtey [45] Mar. 21, 1972

[54] MULTISTATE FLIP-FLOP ELEMENT INCLUDING A LOCAL MEMORY FOR USE IN CONSTRUCTING A DATA PROCESSING SYSTEM

[72] Inventor: Thomas O. Holtey, Newton Lower Falls, Mass.

[73] Assignee: Honeywell Inc., Minneapolis, Minn.

[22] Filed: Mar. 4, 1970

[21] Appl. No.: 16,448

[52] U.S. Cl. ....................340/172.5

[51] Int. Cl. ....................G11c 19/00

[58] Field of Search ....................340/172.5

[56] References Cited

UNITED STATES PATENTS

| | | | |
|---|---|---|---|
| 3,271,741 | 9/1966 | Bates | 340/172.5 |
| 3,430,211 | 2/1969 | Foure et al. | 340/172.5 |
| 3,366,931 | 1/1968 | Githens | 340/172.5 |
| 3,482,265 | 12/1969 | Cohen et al. | 340/172.5 |

*Primary Examiner*—Paul J. Henon
*Assistant Examiner*—Melvin B. Chapnick
*Attorney*—Fred Jacob and Leo Stanger

[57] ABSTRACT

A multi storage element for use as a computer system register stage includes a basic storage device and a small bit wide addressable local memory which provides multi storage for the device. Logic circuits interconnect the addressable local memory and basic storage device for either selectively loading or selectively unloading the device of information contents. Additionally, the multi storage element can include an auxiliary storage device which provides an alternate path for either selective loading or selective unloading the contents of the elements basic storage device. The auxiliary storage devices of each element connect in series to form an auxiliary shift register for either readout or alteration of the basic storage device and local memory contents.

17 Claims, 6 Drawing Figures

INVENTOR
THOMAS O. HOLTEY
BY
Faith F. Driscoll
ATTORNEY

INVENTOR
THOMAS O. HOLTEY
BY Faith F. Driscoll
ATTORNEY

PATENTED MAR 21 1972

3,651,472

SHEET 3 OF 3

INVENTOR
THOMAS O. HOLTEY
BY Faith F. Driscoll
ATTORNEY

MULTISTATE FLIP-FLOP ELEMENT INCLUDING A LOCAL MEMORY FOR USE IN CONSTRUCTING A DATA PROCESSING SYSTEM

BACKGROUND OF THE INVENTION

The present invention relates to electronic data storage apparatus; and, in particular, to multistorage memory elements.

The implementation of electronic data storage apparatus at the system and/or subsystem level is undergoing radical changes in terms of performance, reliability, and design practices with the advent of both medium scale integration (MSI) and large scale integration (LSI) technologies. As used herein, the terms MSI and LSI refer to the manufacturing capabilities of fabricating more and more circuit components along the same chip or substrate in which the electronic functional complexity on the chip approaches the system or subsystem level as distinguished from more elemental units such as logic gates, amplifiers, and the like.

The application of both MSI and LSI technologies to digital systems, as for example, electronic computers, promises to improve operation speed performance. The majority of the space in densely-packaged computers represents packaging and circuits interconnections. This separation in space between computer components results in severe speed problems. Medium scale and large scale integration of circuit components on a single chip or substrate offers promise of alleviating this speed problem.

MSI and LSI technology has modified the customary digital design dichotomy of circuit block designers and system designers. For example, the aim for an LSI or MSI computer system is to employ as few MSI or LSI packages as possible. Further, it is preferable that these packages be of the same type in order to minimize development costs.

Heretofore, computer systems have utilized a number of different packages and interconnected them to provide the requisite storage and transfer means for data (e.g., various working registers), and for providing control storage means (e.g., read only memories, scratch pad and control memories) for controlling the storage and transfer of data. The hardware packages employed for controlling data paths, for storing control information and data are extremely complex, varied, and irregular.

One of the reasons for the number of different packages, interconnections, and complexity in data paths is that a computer system is normally required either to handle an interrupt relating to more than one program or a number of different interrupt levels relating to a single program. More specifically, a computer system includes instruction registers, program counters, data accumulators, etc., which contain information concerning a program being executed. These registers normally comprise a small portion of the system. Whenever the executed program is interrupted, the contents of certain portions thereof of the so called program execution registers must be stored for use later when the execution of the interrupted program is resumed and information concerning the interrupting source must be redistributed to the same registers. This unloading and reloading of certain registers introduces variations in the interconnections of certain portions of the system. More importantly, this distribution process is extremely time consuming.

To facilitate switching between different programs, some systems interconnect certain of these program registers to a high speed scratch pad memory. Normally, the scratch pad memory is structured to be compatible to the word length of the computer system and communicates with the various registers within the system through input and output data paths. While the arrangement makes possible rapid switching between programs by eliminating certain register transfers between a small portion of the system and main memory, it still requires distribution of the scratch pad register contents to and from other portions of the system for intermediate transfers, updating, and modification. Accordingly, in addition to increasing the number of system interconnections, considerable time is still expended in distributing information between the registers and the scratch pad memory along input and output data paths.

Another prior art technique reduces the number of system interconnections, their complexity, and facilitates program switching by first associating an auxiliary storage device with each basic storage device which constitute the conventional working registers of the system and then connecting the auxiliary devices in series to form an auxiliary shift register. This arrangement is disclosed in the copending application of Allen C. Hirtle, Thomas O. Holtey, and Christopher Plumley titled "Data Processing System Having Auxiliary Register Storage" bearing Ser. No. 787,874 filed Dec. 30, 1968, which application issued as U.S. Pat. No. 3,582,902 and is assigned to the assignee named herein. While this arrangement reduces the number of distributed signal lines within a system, it only provides storage for enabling the information in the system at the time of interrupt to be conveniently stored and then restored when the system is ready to resume processing of the interrupted program. Accordingly, the arrangement is unable to handle different levels of interrupts or interrupts from a plurality of programs.

Accordingly, it is an object of the present invention to provide an improved multi storage element usable to implement a major portion of the working registers of a computer system.

It is a further object of the present invention to provide a system which can be economically produced from a number of similar elements which can be constructed using MSI or LSI fabrication techniques.

It is a still further object of the present invention to provide improved means to facilitate the introduction of information regarding interrupt routines upon the occurrence of interrupt signals.

SUMMARY OF THE INVENTION

The above objects of the present invention are achieved in one embodiment of the invention which is a multi storage element which can be selectively combined with like elements to form the "working registers" of a data processing system.

The term "working registers" as used herein is not limited to a register defined in a conventional sense but extends to any and all elements capable of storing information. The aforementioned definition of "working registers" includes registers which serve in a control capacity. Moreover, the definition extends to devices capable of sensing and storing information by mechanical, electromechanical, chemical, hydraulic or similar means.

More particularly, in a conventional data processing system, the invention associates an addressable multiple storage local memory with each of the basic or operational storage devices constituting the working registers. The local memory comprises a one bit wide memory including $2^n$ storage elements which provide alternate contents for the particular basic storage device directly associated therewith. Logic gating interconnects each local memory with the basic bistable storage device for either loading or unloading selectively the contents of the latter respectively from or into the former.

In another embodiment, each multi storage element further comprises an auxiliary storage device. The auxiliary storage device also logically interconnects with its basic storage device to provide an alternate path for either loading or unloading selectively the basic storage device contents.

In still another embodiment of the multi storage element, the auxiliary element also interconnects logically with the addressable local memory thereby providing an alternate path for loading or unloading of the local memory contents.

In both embodiments, the auxiliary storage devices of each multistorage element can connect serially to form an auxiliary shift register which in turn connects to a utilization device. Accordingly, information can be either loaded into or unloaded respectively from both the basic storage devices and local memories through a path provided by the shift register.

The ability of the storage element to load and unload selectively the contents of its basic storage device to or from its associated local memory has particular application in handling interrupts and/or program task switching. For example, a number of the bit wide storage elements of the addressable local memory could contain information linked with a corresponding number of different programs or program tasks. Different ones of the interrupt conditions (e.g., peripheral interrupts, subroutines calls, monitor calls, etc.) would be arranged to first cause the addressing of a predetermined one of these bit locations and the duplication of its basic storage device contents therein.

In order to process the interrupt, the system would then address the bit location of each of the local memories which store information for processing the interrupt condition or information associated with the interrupting program and duplicate its contents into each of the basic storage devices. Here, each of the addressable local memories could be loaded both initially and during system operation from the auxiliary shift register. This eliminates the need to use normal data paths. More importantly, the auxiliary register arrangement enables these loading and unloading operations to take place without interrupting the operation of the system.

The addressable local memory of each multi storage element can also be used to facilitate system diagnosis. Specifically, in some instances it is desirable to take a number of periodic "snapshots" of the system (i.e., the contents of the various working registers of the machine). This can be readily accomplished by addressing in sequence, each of the bit wide storage elements of each of the local memories and loading same with the contents of its basic storage device. When the required number of "snapshots" have been taken, the addressable local memory can be then unloaded at leisure through the auxiliary shift register path for examination and diagnosis.

In a still further embodiment, a plurality of identical multi storage elements of the present invention are organized into a memory array. This array can be used as either a scratch pad or as a control subcommand generator. With the multi storage element of the present invention, the number of bits (i.e., width) constituting the memory array word can be easily varied. Specifically, this number can be easily increased or decreased by simply adding to or subtracting from the number of multi storage elements in the array.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

IN THE DRAWINGS

Figure 2:
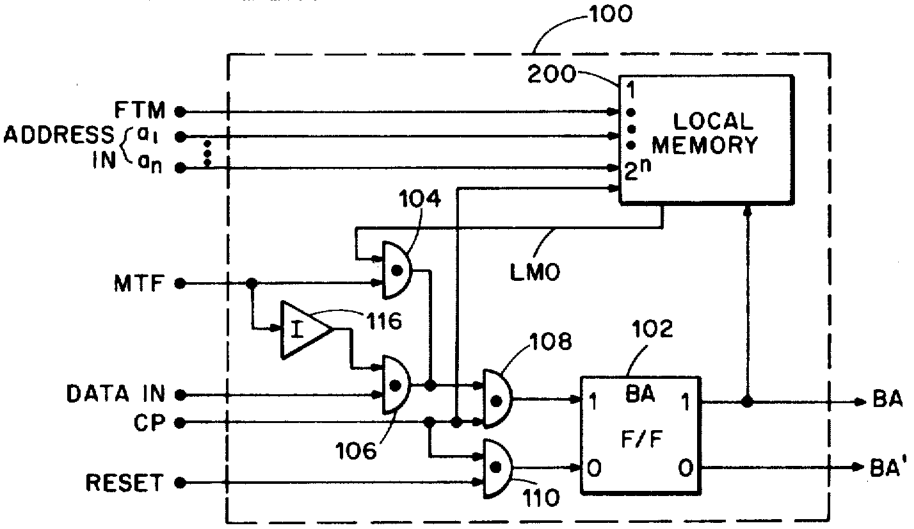
FIG. 2 is a more detailed representation of the multi storage element embodying features of the present invention.
Figure 2A:
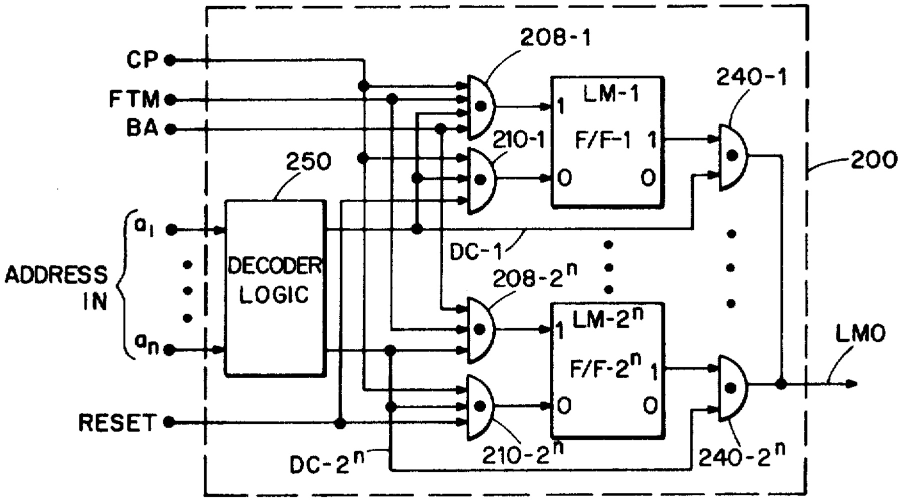
Figure 3A:
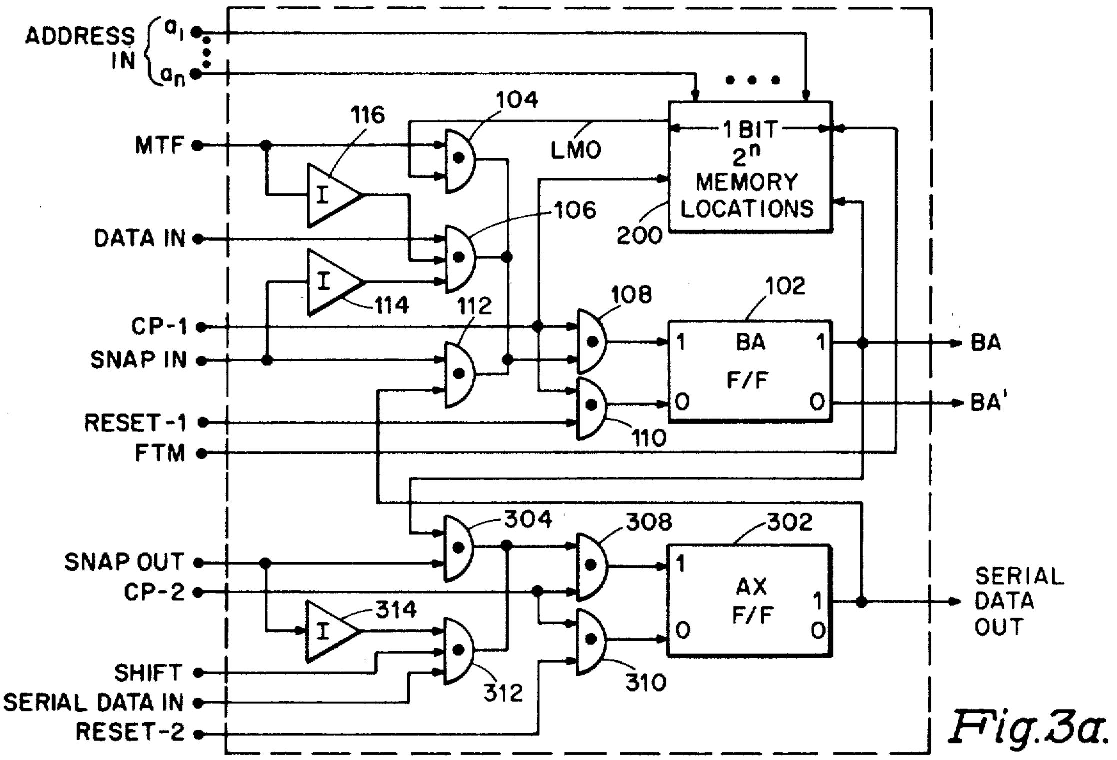
Figure 3B:
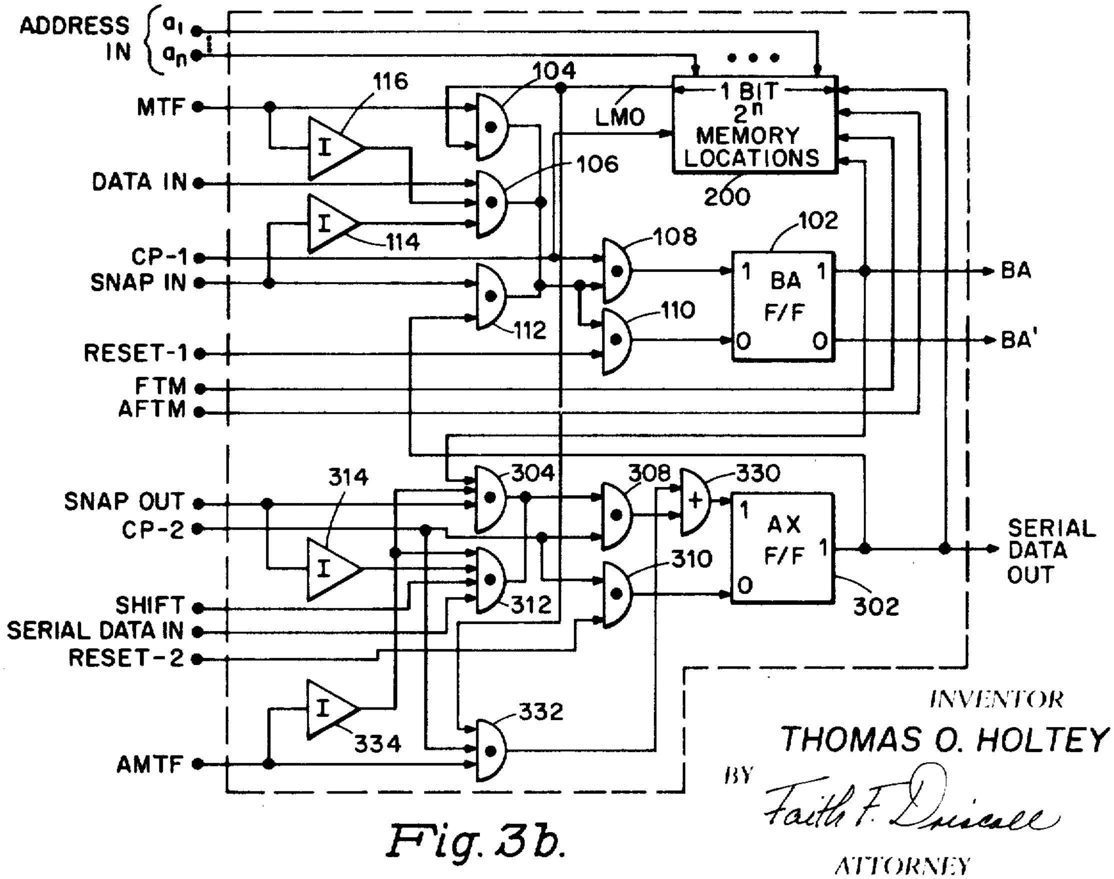
Figure 4:
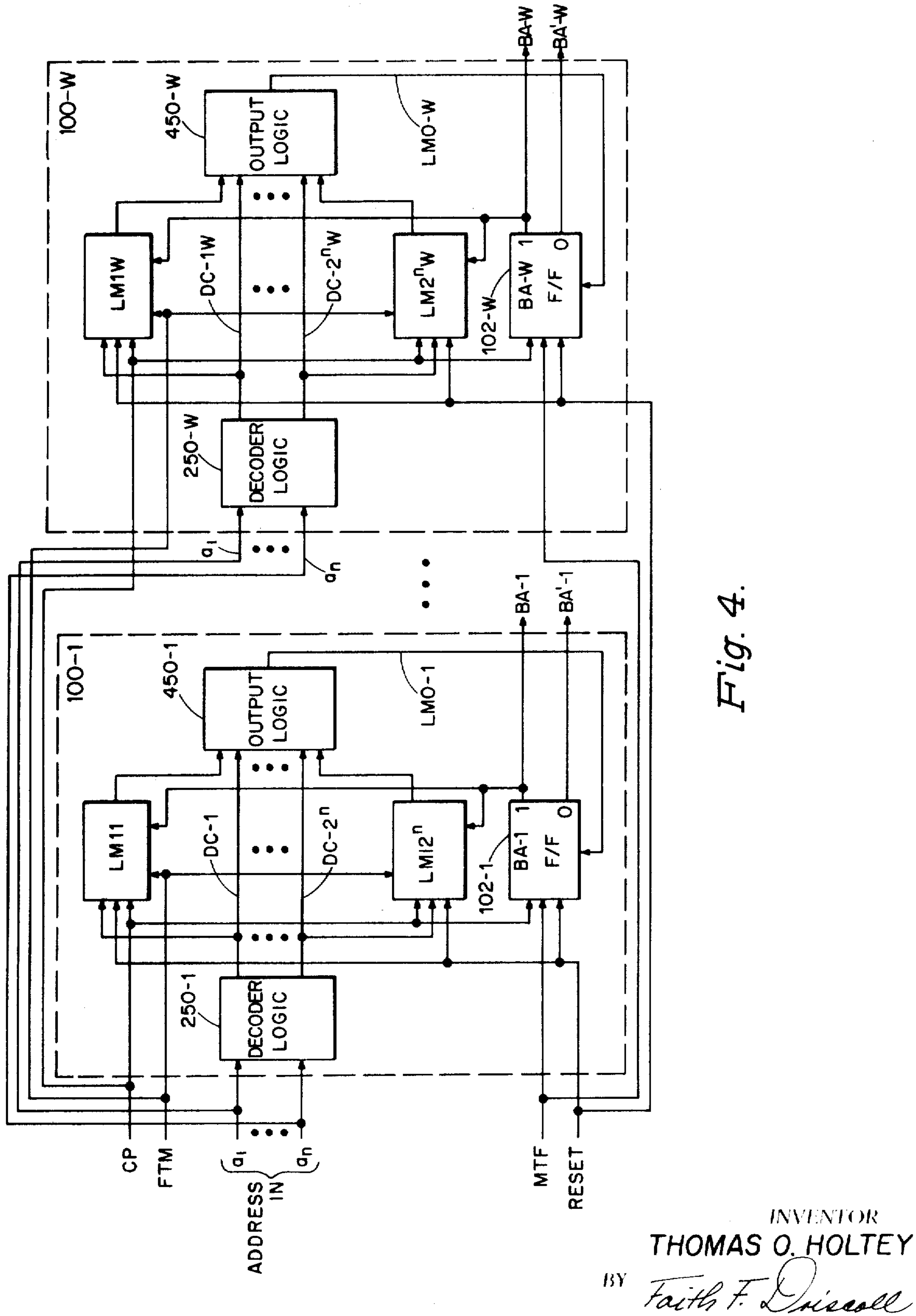

FIG. 2*a* illustrates, in greater detail, the local bit wide memory of FIG. 2;

FIG. 3*a* is a detailed representation of an alternate embodiment of the multi storage element of the present invention;

FIG. 3*b* is a detailed representation of still another embodiment of the multi storage element of the present invention; and, FIG. 4 is a diagrammatic representation of a memory array embodying the multi storage element of the present invention.

DESCRIPTION OF THE ILLUSTRATIVE EMBODIMENT

Figure 1:
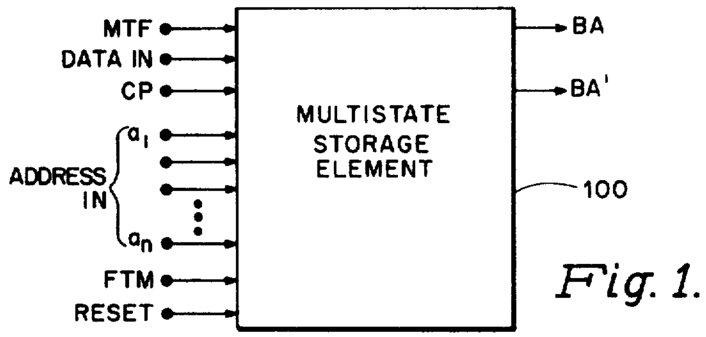
FIG. 1 illustrates a block diagram form of one embodiment of the multi storage element of the present invention.

FIG. 1 illustrates in block form one embodiment of the multi state storage element of the present invention. This element is referenced as 100 in FIG. 1. As mentioned previously, the multi state storage element 100 can serve as one of the thousands of operational flip-flops which constitute the various working registers of a conventional computer system. The element 100 has as inputs a plurality of address lines, $a_1$ through $a_n$, an external data input from a line DATA IN, timing and reset input lines, lines CP and RESET, and a pair of control lines, MTF and FTM. The element 100 provides complementary data output signals on lines BA and BA'.

FIG. 2 discloses the multi storage element 100 in greater detail with corresponding reference numbers indicated. The element 100 receives the same inputs referenced in FIG. 1, and provides data signal levels representative of binary ONE and binary ZERO information to its output lines, BA and BA'. In its simplest form, the element 100 comprises an addressable local memory 200 and a basic (BA) flip-flop 102.

An AND gate 104 and an AND gate 106 apply binary data signal levels from the external data input line DATA IN and an internal data line LMO, to the set input of flip-flop 102. The outputs from AND gates 104 and 106 are then buffered through a timing AND gate 108 to the binary ONE or set input of flip-flop 102. Similarly, the lines RESET and CP are buffered through a second timing AND gate 110 to the binary ZERO or reset input of flip-flop 102.

The flip-flop 102 is conventional in design and has the characteristics of being clocked and raceless. Because the flip-flop is, as illustrated, a set-reset type of storage element, it must be first switched to its reset state before it can be made to assume either binary ONE or binary ZERO state as a function of binary signal levels representative of binary ONE or ZERO data, applied respectively to its data inputs lines, DATA IN and LMO. Obviously, inverting the binary signal levels applied to lines DATA IN and LMO and connecting same as inputs to the reset input of flip-flop 102 eliminates the requirement of having to reset the flip-flop 102 before it can be set.

The flip-flop 102, although illustrated as a set-reset flip-flop, can take alternate forms. For example, flip-flop 102 can take the form of the clocked and raceless flip-flop disclosed in the U.S. Pat. No. 3,454,935 issued to George W. Hippisley, Jr. assigned to the assignee named herein. This type of flip-flop more resembles a trigger flip-flop which without resetting can be made to assume information states as a function of the signal levels applied as data inputs.

As mentioned, the flip-flop 102 has the operational characteristics of being clocked and raceless. The application of a binary ONE signal level to line CP conditions AND gate 108 to switch the previously reset flip-flop 102 to the state of the external input binary signal levels (i.e., the bilevel signal representative of either a binary ONE or ZERO) applied to the line DATA IN. The flip-flop 102 is switched to its binary ZERO or reset state by AND gate 110 when the gate is rendered active by the application of a timing signal level to the line CP concurrent with a binary ONE signal level to line RESET.

The addressable local memory 200 receives a control signal input from line FTM and an address input from address lines $a_1$ through $a_n$. The set output line, BA, is also applied as a further input to local memory 200. The single output line, LMO, of the local memory 200 is applied as an internal data input to the AND gate 104 together with a control signal input from line MTF. The binary control signal level applied to line MTF is inverted by an inverter 116 and then applied as an inhibiting input to AND gate 106.

The external binary data signal levels applied to the DATA IN line are received from components normally connected to the basic flip-flop 102 (e.g., the storage flip-flop of a working register, an accumulator or like flip-flop). In the manner explained herein, a binary ONE control signal level selectively applied to line FTM conditions the local memory 200 to write or duplicate the binary ONE or ZERO contents of flip-flop 102 into the previously cleared bit storage location addressed by the combination of binary signal levels applied to address lines $a_1$ through $a_n$.

FIG. 2a shows in greater detail, the addressable local memory 200. This memory comprises a plurality of bit bistable devices, LM-1 through LM-$2^n$. A pair of AND gates, 208 and 240, interconnect each bit bistable device, LM, with the basic flip-flop 102 of its multi storage element 100.

In greater detail, the gating circuits associated with the input of each of the logic modules LM-1 through LM-$2^n$ include the AND gates 208–1 through 208–$2^n$ and an AND gate 210–1 through 210–$2^n$ which connect respectively to set and reset inputs of the devices LM-1 through LM-$2^n$ as shown. Each of the gates 208 receives a timing input from line CP, an internal data input from the basic flip-flop 102 via line BA, and a selectively applied binary control signal level from line FTM. Similarly, each of AND gates 210 receives reset input from line RESET, an input DC from a decoder logic 250, and a timing input from line CP. The outputs from each of the bistable storage modules LM-1 through LM-$2^n$ connect respectively in common to the local memory output line LMO via AND gates 240–1 through 240–$2^n$.

The address lines $a_1$ through $a_n$ connect as an input to decoder logic 250. The decoder logic 250 can comprise conventional logic gates connected to produce $2^n$ outputs in response to combinations of binary signal levels applied to the address input lines $a_1$ through $a_n$. The individual outputs from the decoder logic 250 are applied to the lines referenced as DC-1 through DC-$2^n$ in addition to being applied as inputs to AND gates 210–1 through 210–$2^n$. The outputs of the decoder logic 250 also connect as inputs to corresponding pairs of the AND gates 208–1 through 208–$2^n$ and 240–1 through 240–$2^n$ as shown.

Since each of the bistable devices LM–1 through LM–$2^n$ are of the set-reset type, each logic device is first reset before it is permitted to be selectively switched to the state of its basic flip-flop 102. The resetting of each of the flip-flop LM-1 through LM-$2^n$ is accomplished by activating their respective AND gates 210–1 through 210–$2^n$ by first addressing the bistable device LM and then jointly applying a signal level to lines RESET and CP. Addressing is accomplished by applying a unique combination of binary signal levels to decoder logic 250 via the address lines $a_1$ through $a_n$. The decoder logic 250 is conditioned by these binary signal levels to apply an output signal level to the appropriate one of the lines DC–1 through DC–$2^n$ which connects to the device identified therewith (i.e., the bistable device assigned that address).

Each of the bistable devices LM–1 through LM–$2^n$ can be selectively switched to the state of its basic element 102 as follows. First the device LM is addressed by lines $a_1$ through $a_n$ and then binary signal levels are jointly applied to lines FTM and CP. The particular element addressed is switched to the binary ONE or binary ZERO state of the basic flip-flop 102, represented respectively by the presence or absence of a signal level to line BA. At the same time, the output of the addressed bistable device is also applied to line LMO via the appropriate AND gate 240. Accordingly, the state of flip-flop 102 can be selectively switched to that of the addressed bistable element, LM, in the manner described herein below.

As previously mentioned in relation to flip-flop 102, each of the bistable devices LM–1 through LM–$2^n$ can also take alternate forms of flip-flops in addition to being modified in a manner to eliminating the reset requirement. For the purposes of avoiding repetition, no further mention will be made of the fact that each flip-flop herein is appropriately switched to its reset state prior to having its state changed by binary signal levels applied to its data inputs.

FIG. 3a illustrates an alternate embodiment of the multi storage element 100, labeled with corresponding reference numbers, which further includes an auxiliary flip-flop 302. The flip-flop 302 and the basic flip-flop 102 interconnect through gating circuits which include AND gate 112 and AND gate 304. In addition to receiving a binary data input signal level from the set output line, SERIAL DATA OUT of the auxiliary flip-flop 302, AND gate 112 also receives a conditioning signal level from a line, SNAP IN. The binary signal level on line, SNAP IN is inverted by an inverter 114 and applied to the AND gate 106 which receives as a further input, a binary signal level on the line MTF inverted by the inverter 116.

A binary ONE control signal level selectively applied to the line, SNAP IN, conditions the AND gate 112 to duplicate or "-snap-in" the contents of the auxiliary flip-flop 302 applied to line SERIAL DATA OUT into the basic flip-flop 102. Duplication occurs when an AND gate 108 is conditioned by a timing signal applied to line CP–1. The inverted binary signal level from line SNAP IN conditions AND gate 106, to inhibit the interconnecting data signal levels appearing on the line, DATA IN, from affecting the status of the basic flip-flop 102 when the contents of the auxiliary flip-flop 302 are being "-snapped-in."

A binary ONE control signal level on line MTF conditions AND gate 104 to duplicate into the basic flip-flop 102 the binary data signal level appearing on line LMO. The binary signal level appearing on line LMO represents the contents of the currently addressed memory bit location of local memory 200 as selected by the aforementioned combination of binary signal levels applied to address lines $a_1$ through $a_n$. The binary ONE signal level applied to line MTF inverted by an inverter 116 conditions AND gate 106 to inhibit the external interconnecting binary data signal levels appearing on line DATA IN from affecting the status of the basic flip-flop 102 when the contents of the currently addressed location of memory 200 applied to AND gate 104 are being duplicated or written into the basic flip-flop 102. Again, duplication occurs when the AND gate 104 is conditioned by a timing signal level applied to line CP–1.

The auxiliary flip-flop 302 has input gating structure similar to flip-flop 102 which includes a set AND gate 308 and a reset AND gate 310. The AND gate 308 receives the set output of the basic flip-flop 102 from line BA via an AND gate 304 together with a selectively generated binary control signal level on a line SNAP OUT. The application of a binary ONE control signal level to line, SNAP OUT, conditions AND gate 304 to "snap out" or duplicate the contents of the basic flip-flop 102 into the auxiliary flip-flop 302. When the AND gate 308 receives a timing signal level on line CP-2, the contents of the basic flip-flop 102 applied to the output of AND gate 304 are "snapped out" or duplicated into flip-flop 302.

Each of the flip-flops 102 and 302 are independently reset via AND gates 110 and 310, respectively, by the joint application of timing signal levels and binary ONE reset signal levels to the lines CP–1, RESET–1, and lines CP–2 and RESET–2.

The AND gate 308 also receives a data input from line SERIAL DATA IN and a binary control signal level on line SHIFT which are buffered through an AND gate 312. The AND gate 312 also receives from an inverter 314, control signal levels applied to line SNAP OUT. A binary ONE signal level on the line SNAP OUT serves to inhibit the AND gate 312 from applying a binary data signal level on the line SERIAL DATA IN from a previous stage (i.e., another auxiliary flip-flop) when the contents of the basic flip-flop are being "-snapped into" its auxiliary flip-flop 302.

The output binary signal levels applied to lines BA and SERIAL DATA OUT, in addition to being recirculated to the associated flip-flops 102 and 302, also serve in a conventional capacity. Specifically, the binary signal level on line SERIAL DATA OUT appears as an input to the next successive storage unit 100 in an extended shift register arrangement consisting entirely of auxiliary flip-flops 302. The binary signal level on line BA which corresponds to the output of the basic flip-flop 102 functions in its conventional data representing capacity (i.e., stores binary ONE and binary ZERO information).

For further details regarding the manner in which the basic flip-flops and auxiliary flip-flops are connected in a conventional system to form the working registers thereof, reference should be made to the aforementioned patent application of Allen C. Hirtle, Thomas O. Holtey, and Christopher Plumley bearing Ser. No. 787,874 issued U.S. Pat. No. 3,582,902 and which by this reference is incorporated herein.

Each of the flip-flops 102 and 302 is independently clocked in a conventional manner by timing pulses applied to the lines CP–1 and CP–2. These pulses may be derived from either a single master timing source or from two separate timing sources, whose outputs are phased to guarantee raceless operation.

FIG. 3*b* illustrates another embodiment of the multi storage element 100 with corresponding reference numbers indicated. In addition to the elements of the embodiment of FIG. 3*a*, the multi storage element of FIG. 3*b* further includes an OR gate 330, an AND gate 332, and an inverter 334. In addition to receiving an output from AND gate 308, the auxiliary flip-flop 302 receives from the OR gate 330 a signal from local memory output line, LMO, together with a binary control signal level from line AMTF buffered through the AND gate 332. The binary signal level on line AMTF is inverted by an inverter 334 and applied as an inhibiting input to both AND gates 304 and 312.

A binary ONE signal level on line AMTF conditions the AND gate 332 of the auxiliary flip-flop 302 to duplicate therein, the bit contents of the addressed memory location of memory 200 appearing on line LMO. Concurrently therewith, the binary ONE signal level on line AMTF, inverted by the inverter 334, inhibits the AND gates 304 and 312 from applying their respective binary data inputs appearing on lines BA and SERIAL DATA IN respectively to affect the status of the auxiliary flip-flop 302 when the contents of the addressed memory bit location are duplicated into the auxiliary flip-flop 302.

The multi storage element 100 of FIG. 3*b* receives an additional binary control signal level from line AFTM which is applied as an input to the addressable local memory 200. The local memory 200 also receives the set output of the auxiliary flip-flop 302 from line SERIAL DATA OUT. A binary ONE signal level on line AFTM conditions the local memory 200 for writing or duplicating the contents of its auxiliary flip-flop 302 into the bit location currently addressed by the combination of binary signal levels applied to address lines $a_1$ through $a_n$. The lines AFTM and SERIAL DATA OUT are applied as inputs to the input gating of each of the logic modules LM–1 through LM–$2^n$ of FIG. 2*a* by conventional gating means, not shown.

FIG. 4 discloses a memory array arrangement consisting of a plurality of multi state storage elements 100, referenced as elements 100–1 through 100–W. More particularly, each of the elements 100 corresponds to the embodiment illustrated in FIG. 2 and includes the addressable local memory element 200 of FIG. 2*a*. In FIG. 4, the output logic 450 of each of the elements 100 corresponds to the plurality of gates 240–1 to 240–$2^n$ of FIG. 2*a*. By arranging a number of elements 100 adjacent one another, a memory array consisting of the row having $2^n$ elements and a corresponding number of columns equal to the number of elements 100. Constructing an array with elements 100 of the present invention has the advantage of being able to readily accommodate variations in word length by increasing the number of elements in a row. Each of the elements 100 of FIG. 4 receive in common the same input lines shown in FIGS. 1 and 2. The outputs from the memory array are taken from lines BA–1, BA′–1 through BA–W, BA′–W. Since the binary signal levels appearing on each of the lines BA–1 and BA′–1 are complementary, only one set of lines are necessary for most applications (i.e., control element, scratch pad, etc.).

When the array is used as a control element (i.e., subcommand generator) the logic modules 1–$2^n$ will have been loaded initially with the appropriate binary information by way of either the basic flip-flop 102 or by parallel data paths, not shown. Once loaded, binary address signal levels are applied to address lines $a_1$ through $a_n$ together with a binary ONE signal level on line MTF. This combination of binary signal levels causes the bit contents of a currently addressed logic module, LM, to be duplicated into its respective basic flip-flop 102. Accordingly, a succession of different binary address signal levels together with binary ONE signal levels applied to line MTF, cause the prestored or preloaded sequence of binary ONES and ZEROS to be applied successively to lines BA–1 through BA–W. It will be obvious to those skilled in the art that variations in the sequence of output binary signal levels applied to lines BA–1 through BA–W are obtained by varying the sequence of address signals applied to address lines $a_1$ through $a_n$.

To utilize the memory array as a scratch pad memory, combinations of binary signal levels are applied to address lines $a_1$ through $a_n$, concurrent with a binary ONE signal level to line FTM. This set of signal levels causes the contents of each of the basic flip-flops 102–1 through 102–W to be duplicated into the addressed bit location of each of the local memories 200–1 through 200–W. It is assumed that previously each of the basic flip-flops will have been appropriately set by binary data signal levels applied to its data input (not shown) from an external source (not shown).

The abovementioned binary signal levels applied to address lines $a_1$ through $a_n$ and the binary signal levels selectively applied to control lines MTF, FTM, etc., can be generated from a set of switches, a set of push buttons, a control sequence generator, or a microprogrammed control element programmed to produce the desired sequence of binary signal levels. The aforementioned microprogrammed control element may take the form of control elements described at pages 461–470 in the text entitled "Digital Computer Design Fundamentals" by Yaohan Chu, McGraw-Hill Book Company, Inc. Copyright 1962.

Mention has been made of the use of the instant invention to facilitate interrupt operations. In this capacity, the information presently stored in the active working registers of the system can be conveniently stored in local memory 200 of each multi state element 100 for either interrupts from a plurality of programs or successive levels of interrupt conditions associated with a single program. The subroutine associated with the interrupt condition can be then read into the basic flip-flop 102 from an appropriate bit location of its local memory 100.

With reference to FIGS. 2, 2*a*, 3*a*, 3*b*, and 4, the invention accomplishes the above interrupt operations as follows. First, the interrupted program or the interrupted condition causes a first combination of binary signal levels to be applied to address lines $a_1$ through $a_n$, concurrent with a binary ONE signal level to line FTM. The first combination of binary address signal levels is related to the interrupted program. The above set of binary signal levels causes the status of the interrupted program (i.e., the contents of each of the basic flip-flops 102 of FIGS. 2, 3*a*, 3*b*, and 4) to be duplicated into the addressed bit location of each of the local memories 200 of the multi state elements 100 which comprise either the bit stages of the various working registers or alternately one or more scratch pad memories of the computer system.

After duplication, the interrupt condition or interrupting program causes a second combination of binary signal levels to be applied to address lines $a_1$ through $a_n$ concurrently with the application of a binary ONE signal level to line MTF. This last combination of binary signal levels causes the information of the new (interrupting) program stored in each of the addressed memory bit locations to be read into each of the basic flip-flops 102. At this point, the information pertinent to the interrupting program or subroutine has been stored in either the appropriate internal registers or in one or more scratch pad memories of the data processing system and the system is then ready to take the appropriate action in processing the interrupting program.

When the processing of the interrupt has been completed, the system restores the information stored in each of the bit locations associated with the interrupted program to their respective basic flip-flops 102. The restoring operation is accomplished by again applying the first combination of binary signal levels to address lines $a_1$ through $a_n$ concurrent with a binary ONE signal level to line MTF. This causes the bit contents of each of the addressed local memory locations to be duplicated into its respective basic flip-flop. Since duplication is accomplished by selectively applying the bit contents of each of the addressable memories 200 to a corresponding one of the line LMO; each of the local memories in this instance operates as a read only memory. Accordingly, the information read into each of the basic flip-flops 102 does not have to be rewritten into the previously addressed local memory bit location from whence it was read.

The local memory of the instant invention also can be used in combination with known addressing techniques which associate groups of bit memory locations with different programs/program states as well as associating groups of different bit memory locations with different interrupt subroutines. It will be obvious that these programs, as well as interrupt conditions, can be processed on either a priority or non-priority basis.

The organization of the storage elements 100 is such that the above mentioned loading and unloading operations characteristic of the interrupt process may be accomplished essentially simultaneously (i.e., within pulse periods). That is, with the multi flip-flop of the invention, program status of a system could be switched in two clock periods in response to an interrupt. One clock period is required to store the contents in the proper location of each of the local memories and a second period is required to load the system registers with the bit information from each of the local memories to process a new program.

In addition to using the present invention to facilitate interrupt operations, the present invention may serve in a diagnostic capacity. More specifically, at different points of time during the processing of a particular program instruction or portion of a program it may be desirable to periodically "-snapshot" the contents of certain working registers within the system. This is accomplished by applying different combinations of binary signal levels to address lines $a_1$ through $a_n$, concurrent with binary ONE signal level to line FTM. Each unique combination of binary address signal levels applied to address lines $a_1$ through $a_n$ together with a ONE level to line FTM, conditions each basic flip-flop 102 in the system to duplicate its contents into a different addressed bit location of its local memory 200. When the desired number of "-snapshots" have been taken, the bit contents of each of the local memories 200 can be either read out through auxiliary paths, not shown, or through the auxiliary shift register constructed from auxiliary flip-flops 302.

With reference to FIG. 3*b*, the above mentioned readout operation will be briefly described. First readout of each of the bit locations of each of the local memories 200 via the auxiliary shift register is accomplished by first applying the particular combination of binary signal levels to address lines $a_1$ through $a_n$, concurrent with a binary ONE signal level to line AMTF. This set of binary signal levels causes the bit contents of the addressed local memory location of each multi storage element 100 to be duplicated into its auxiliary flip-flop 302. A binary ONE signal level is then applied to the line SHIFT for a predetermined period of time (i.e., the number of timing signal levels required to shift the auxiliary shift register information contents into a utilization device). After the elapse of the predetermined period of time, the above operation is then repeated for readout of the bit contents of a different bit location of each of the local memories 200.

In a system including multi storage elements implemented as the embodiment of FIG. 3*a*, readout of local memory bit locations is accomplished in a manner similar to that described in relation to FIG. 3b with one important difference. This difference resides in having the transfer of bit contents of each of the local memories 200 proceed through in basic flip-flop 102. In this instance, a particular combination of binary signal levels is applied to address lines $a_1$ through $a_n$ concurrent with a binary ONE signal level to line MTF. This set of binary signal levels causes the bit contents of the addressed local memory location of each multi storage element 100 in the system to be duplicated into its basic flip-flop 102. Next, a binary ONE signal level is applied to line AMTF which causes the binary contents of each of the basic flip-flop 102 to be duplicated in its auxiliary flip-flop 302. The contents of the auxiliary shift register can be then transferred to a utilization as described above for FIG. 3*b*. Obviously, the embodiment of FIG. 3*b* is used when it is desirable to read out the contents of each of the local memories without having to disturb normal system operation. By contrast when system operation can tolerate interruption, (e.g., initial diagnosis) the embodiment of FIG. 3*a* finds utilization.

It should be readily apparent from the foregoing that the auxiliary shift register can be used to load each of the local memories 200 with binary information by simply performing in reverse order operations similar to those described in relation to FIGS. 3*a* and 3*b*. Briefly, referring to FIG. 3*a*, a bit location of each of the local memories 200 can be loaded from the auxiliary shift register as follows. First, the bit contents of each of the auxiliary flip-flops 302 are duplicated into the basic flip-flop 102 associated therewith by applying a binary ONE signal level to line SNAP IN. Then, each of the local memories 200 is addressed via lines $a_1$ through $a_n$ concurrent with applying a binary ONE signal level to FTM. This causes the bit contents of each of the basic flip-flops 102 to be written or duplicated into the addressed bit location of its local memory 200.

In FIG. 3*b*, the bit contents of each of the local memories is loaded from their respective auxiliary flip-flops 302 by addressing one of the bit locations of each of the local memories via lines $a_1$ through $a_n$ concurrent with applying a binary ONE signal level to line AFTM. This causes the bit contents of each of the auxiliary flip-flops 302 to be written or duplicated into the addressed bit location of its local memory 200.

For further details relating to loading of the auxiliary shift register, the aforementioned copending patent application of Hirtle, Holtey, and Plumley should be consulted.

While the multi storage element finds particular use in MSI and LSI systems, it could also be constructed from several integrated circuit (IC) chips. Also, both the basic flip-flops, auxiliary flip-flops, and logic modules of the local memory could also be constructed from conventional bistable flip-flops, as for example, trigger, JK, RS, RST flip-flops in addition to the flip-flop disclosed in the aforementioned Hippisley, Jr. patent. These flip-flops may be either synchronous or asynchronous and can be implemented as flip-flops disclosed in the aforementioned Chu text.

The subject invention has disclosed a multi flip-flop which can be utilized in a variety of applications. Those applications disclosed herein should not be construed as a limitation of the present invention. For example, the multi flip-flop array could, with the appropriate address logic, be used as a push-down stack, a queue, etc.

Further, the principles of the invention are not limited to a particular system or organization but are applicable to all systems/subsystems (e.g., peripheral controllers, peripheral devices, etc.) which can make use of the multi storage features of the present invention. For example, in some systems or subsystems, it may be desirable to supplement only the more important operational flip-flops and/or registers with the local memory of the present invention.

It will be appreciated by those skilled in the art that still various other changes may be made to the embodiments illustrated without departing from the spirit and scope of the invention.

To prevent undue burdening the description with matter within the lieu of those skilled in the art, a block diagram approach has been followed with a detailed functional description of each block and specific identification of the circuitry it represents. The individual engineer is free to select elements such as flip-flop circuits, logic gates, decoders, etc. from his own background or from available standard references such as Arithmetic Operations in Digital Computers by R. K. Richards (Van Nostrand Publishing Company), and Pulse, Digital and Switching Waveforms by Millman and Taub (McGraw-Hill Book Company, Inc.).

While in accordance with the provisions and statutes there has been illustrated and described the best form of the invention known, certain changes may be made to the described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A LSI multi memory storage device for use as a working register stage in a data processing system including a plurality of working registers, said device comprising:

a bistable storage means of said working register stage including an input circuit and an output circuit, said input circuit including means for receiving an external data input signal level and said output circuit including means for transmitting an external data output signal level in response to said external data input signal level;

a one bit wide addressable local memory storage means comprising a predetermined number of bit storage locations, said local memory storage means including an input circuit and an output circuit directly coupled respectively to said output circuit and said input circuit of said bistable storage means;

means for applying to said local memory means a multi bit address having a number of bits for addressing any one of said predetermined number of bit storage locations;

means for selectively applying a first control signal level to said local memory means input circuit for conditioning said local memory means to duplicate the contents of said bistable storage means in one of said bit storage locations specified by said multi bit address; and, means for applying a second control signal level timed independently of said first control signal level to said bistable storage means input circuit for conditioning said bistable storage means to duplicate therein the bit contents of an addressed local memory bit storage location for transmission by said output circuit in place of said external data output signal level.

2. A LSI system of a plurality of memory logic elements each being arranged in a corresponding number of columns to form an array of coordinate rows of bit logic storage elements, each memory logic element comprising:

bistable storage means including input circuit logic means and output circuit logic means;

a bit wide addressable local memory means being associated with said bistable storage means and comprising a predetermined number of said bit logic storage elements, each of said bit logic storage elements being associated with a different row of said array and all of said bit storage elements forming a different column of said array, said local memory means including input logic circuit means and output logic circuit means directly coupled respectively to said output and input circuit logic means of said bistable storage means; and said system further including:

means for simultaneously applying to said local memory means of each of said memory logic elements, a multi bit address having a number of bits for specifying any one of said predetermined number of bit logic storage elements;

means for applying a first control signal level to said local memory means input logic circuit means of each of said memory logic elements for conditioning each of said local memory means to duplicate therein the contents of said bistable storage means associated therewith in a bit logic storage element specified by said multi bit address; and, means for applying a second control signal level timed independently of said first control signal level to said input logic circuit means of each of said bistable storage means for conditioning said bistable storage means of each of said logic elements to duplicate therein the contents of an addressed one of said local memory bit logic storage elements.

3. In a data processing system, the combination comprising:

a plurality of paired storage devices;

logic gating means for selectively combining one storage device of each of said paired storage devices to form the various storage and working registers of said data processing system for transmitting and receiving external signal levels therebetween;

a corresponding number of bit wide addressable local memories, each said local memory being directly connected to be associated with a different one of said one storage devices of said paired devices and comprising a plurality of bit storage locations;

addressing means directly coupled to each of said local memories for selecting any one of said plurality of bit storage locations within each of said local memories;

first gating means connecting said one storage device of each of said paired storage devices to the local memory associated therewith to condition said one storage device of each of said paired storage devices to duplicate therein a first signal representation of the information read from an addressed bit location of the local memory associated therewith;

second gating means connecting the other storage device of each of said paired storage devices to said one storage device paired therewith to condition said other one to duplicate therein a second signal representation of the information stored in said one storage device; and, third gating means connected to condition said other one of each of said paired devices for transferring said second signal representation received from each of said one storage device serially only through said other one of each of said paired storage devices.

4. In the data processing system according to claim 3 wherein said system is of LSI construction, said first gating means including a plurality of AND gating means, each of said AND gating means connected to receive a line MTF:

said second gating means including a plurality of AND gating means, each of said AND gating means connected to receive a line SNAPOUT;

said third gating means including a plurality of AND gating means, each of said AND gating means connected to receive a line SHIFT; and, the application of a signal level to said line MTF conditioning each of said AND gating means of said first gating means to duplicate into said one storage device of each of said paired storage devices the content of said addressed bit location of said local memory associated therewith selected by said addressing means, the application of a signal to said line SNAPOUT conditioning each of said AND gating means of said second gating means to duplicate into said other storage device of each of said paired storage devices said second signal representation of said one storage device and the application of a signal level to line SHIFT conditioning each of said AND gating means of said third gating means to transfer serially each said second signal representation.

5. In the data processing system according to claim 4 wherein each of said addressable local memories includes:

a plurality of bistable elements, corresponding in number to the number of said bit locations; and, fourth AND gating means connecting said addressing means to each of said bistable elements in series with said AND gating means of said first gating means of one storage device associated therewith for conditioning said last recited AND gating means to duplicate the content of one of said bistable elements corresponding to said selected bit location into said one storage device.

6. In a data processing system wherein information is stored and processed in a plurality of working registers each of which comprises a number of first bistable elements and includes logic means for interconnecting said first bistable elements to receive and transmit external signal levels within said system, said system further including:

a group of bit wide addressable local memory elements, similar in construction to said first bistable elements, each of said elements comprising a plurality of bit locations, each of said local memory elements further connected to receive a set of common address lines and including logic means for selecting individual bit locations of each of said local memory elements in response to combinations of binary address signal levels applied to said common address lines;

first logic gating means for interconnecting one of said group of said local memory elements to a different one of selected ones of said first bistable elements;

a number of common control lines, each of said common control lines connected to the same predetermined points within each of said first logic gating means; and, each of said first logic gating means including first means connected to condition each of said selected ones of said first bistable elements in response to a signal level being applied to a first one of said control lines to duplicate therein, the bit contents of a bit location within each of said local memory elements selected by said address signal levels.

7. In system according to claim 6 wherein each of said first logic gating means includes means connected to condition each of said local memory elements in response to a signal level applied to a second one of said control lines to duplicate the contents of each of said selected ones of said first bistable elements into a bit location within said one of said group of local memory elements associated therewith, said location being specified by the combination of said binary address signal levels applied to said common address lines.

8. In the system according to claim 6 wherein said system further includes a group of auxiliary bistable elements similar in construction to said first bistable elements;

second logic gating means interconnecting each one of said group of auxiliary bistable elements to be associated with a different one of said selected ones of said first bistable elements;

means for applying clocking signals to said first bistable elements and to said group of auxiliary bistable elements respectively;

means for applying selectively a signal level to a third one of said control lines for conditioning each of said second logic gating means to duplicate into each of said auxiliary bistable elements, a signal representation of the contents of said different one of said selected ones of said first bistable elements associated therewith; and, means for applying a signal level to a fourth one of said control lines for conditioning said second logic gating means to thereafter serially transfer in response to successive clocking signals, said signal representation received from said selected ones of each of said first bistable elements only through said auxiliary bistable elements to a utilization device.

9. In the system according to claim 6 wherein said system further includes a group of auxiliary bistable elements;

further logic gating means for interconnecting each of said local memory elements to be associated with a different one of said auxiliary bistable elements, said further logic gating means including means adapted to be conditioned by a signal level applied to a second one of said control lines concurrent with the application of a combination of signal levels to said address lines, to duplicate the contents of the local memory bit location selected by said logic means within each of said local memory elements into said different one of said auxiliary bistable elements associated therewith; and, logic gating means interconnecting said auxiliary bistable elements in series for transferring said contents received from said bit location only through said auxiliary bistable elements.

10. In the system according to claim 9 wherein said further logic gating means includes means responsive to the application of a signal level to a third one of said control lines concurrent with the application of said combination of signal levels to said address lines to condition said further logic gating means to duplicate the contents of each of said auxiliary bistable elements into said selected bit location of one of said local memory elements associated therewith.

11. In the system according to claim 6 wherein the number of said local memory elements of said group is less than said number of first bistable elements.

12. In the data processing system according to claim 6 wherein said working registers are of LSI construction and predetermined ones of said bit locations of each of said local memory elements store information pertinent to the processing of a plurality of programs and others of said bit locations are available for storing status information, said first means of said first logic gating means including:

first AND gating means connecting each of said local memory elements individually to said different one of said selected one of said elements, said first AND gating means being connected to said first one of said control lines designated MTF for conditioning each of said first bistable elements during a first operation to duplicate therein, the bit contents of one of said predetermined ones of said bit locations of each of said local memory elements selected by said logic means in response to a first combination of said address signal levels; and, second AND gating means connecting each of said selected ones of said first bistable elements to said local memory element associated therewith, said second AND gating means connected to receive a second one of said control lines designated FTM for conditioning each of said local memory elements to duplicate during a second operation, the contents of said first bistable elements into one of said others of said bit locations selected by said logic means in response to a second combination of said address signal levels whereby the sequence of applying signal levels to said lines MTF and FTM establishes the order for performing said first and second operations at the bit locations specified by aid combinations of said address signal levels.

13. In the data processing system of claim 12 wherein each of said local memory elements includes:

a plurality of bistable elements similar in construction to said first bistable elements and corresponding in number to the number of said bit locations;

third AND gating means connecting said logic means to each of said bistable elements and in series with said first AND gating means of said first bistable element associated therewith; and, conductor means connecting each of said bistable elements of said local memory elements to said logic means and to said second AND gating means associated therewith.

14. In the data processing system according to claim 6 wherein predetermined ones of said bit locations of each of said local memory elements are available to store state information and said system further includes:

a plurality of auxiliary bistable elements equal in number to the number of said first bistable elements and similar in construction to said first bistable elements;

second logic means including a plurality of AND gating means for connecting each of auxiliary bistable elements individually to a different one of said local memory elements;

third logic means including a plurality of AND gating means for connecting each of said auxiliary bistable elements to form an auxiliary shift register; and, said common control lines further including lines FTM, AFTM, SHIFT and clocking lines CP-1 and CP-2, said lines FTM and AFTM being connected to the same points within said second logic means and said line SHIFT being connected to the same points within said third logic means and said clocking lines CP-1 and CP-2 being connected to apply clocking signals to said first bistable elements and said auxiliary elements respectively whereby each of said local memory elements are conditioned to duplicate into one of said predetermined bit locations specified by said address signal levels the contents of said first bistable element associated therewith in response to a signal level being applied to said line FTM concurrent with a signal being applied to said line CP-1, each of said auxiliary bistable elements being conditioned subsequently to duplicate therein the contents of said one of said predetermined bit locations of said local memory elements associated therewith in response to a signal level being applied to said line AMTF and thereafter serially transfer said information contents through said auxiliary shift register in response to a signal level being applied to said line SHIFT concurrent with said clocking signals being applied to said line CP-2.

15. In the system according to claim 6 wherein the number of said local memory elements of said group corresponds to the number of said first bistable elements.

16. A LSI memory array for generating sets of control signal levels on a plurality of lines BA-1 through BA-W, said memory array including W identical multi storage elements positioned along a row, each multi storage element comprising:

a one bit wide local memory means, LM, for providing a multi state output to a memory output line LMO;

said local memory means including a plurality of bit logic storage circuits, LM-1 -LM$2^n$, and memory address selection means for producing a predetermined one of a plurality of decoder signal levels DC-1 through DC-$2^n$ in response to each different combination of address signal levels applied to a common set of address lines $a_1$ through $a_n$ for selecting one of said bit logic storage circuits, said local memory means further including output logic means for connecting each of said bit logic circuits to said line LMO;

a bistable storage device, said bistable device including input means and output means, said output means being connected to a different predetermined one of said lines BA-1 through BA-W;

said bistable storage device further including first AND gating means for interconnecting said memory output line LMO with said bistable device input means, said first AND gating means being adapted to receive a control input line MTF; and, said first AND gating means of said bistable device of each multi storage element being connected to be conditioned by a signal level applied to said line MTF concurrent with a one of said decoder signal levels DC-1 through DC-$2^n$ produced by said memory address selection means in response to the address signal levels being applied to said lines $a_1$ through $a_n$, to duplicate therein the information contents of a selected one of said bit logic storage means applied to said line LMO whereby said duplicated contents of said bistable storage device of each multi storage element applied to individual ones of said lines BA-1 through BA-W produce a first set of control signal levels from said memory array wherein W and $n$ are integers.

17. The memory array of claim 16 wherein each of said multi storage elements further includes second AND gating means for interconnecting each of said lines BA-1 through BA-W to each of said storage circuits LM-1 through LM-$2^n$ respectively, said second AND gating means being adapted to receive a control line FTM and being connected to said address selection means, each of said second AND gating means being conditioned by a signal applied to said line FTM to duplicate the contents of said bistable storage device of each of said W multi storage elements applied to each of said lines BA-1 through BA-W respectively into one of the bit storage circuits, LM-1 through LM-$2^n$ of each of said local memory means, selected by said address signal levels applied to said address lines $a_1$ through $a_n$.

* * * * *